(12) United States Patent
Nobbe

(10) Patent No.: US 7,175,729 B2
(45) Date of Patent: Feb. 13, 2007

(54) METHOD FOR CONNECTING TWO ENDS OF FLAT TUBULAR FILM SHEETS EQUIPPED WITH SIDE CREASES

(75) Inventor: Ludger Nobbe, Hagen (DE)

(73) Assignee: Windmoeller & Hoelscher KG, Lengerich (DE)

( * ) Notice: Subject to any disclaimer, the term of this patent is extended or adjusted under 35 U.S.C. 154(b) by 595 days.

(21) Appl. No.: 10/272,288

(22) Filed: Oct. 17, 2002

(65) Prior Publication Data
US 2003/0089760 A1 May 15, 2003

(30) Foreign Application Priority Data
Oct. 17, 2001 (DE) .................................. 101 51 144

(51) Int. Cl.
*B29C 65/00* (2006.01)
*B65B 43/00* (2006.01)

(52) U.S. Cl. ...................... 156/250; 156/252; 156/254; 156/256; 156/257; 53/452; 53/455; 53/459

(58) Field of Classification Search .............. 156/250, 156/252, 254, 256, 257; 53/452, 455, 459
See application file for complete search history.

(56) References Cited

U.S. PATENT DOCUMENTS 3,691,705 A * 9/1972 Luckey ......................... 52/108
5,009,632 A * 4/1991 Kruessel ...................... 493/189

* cited by examiner

*Primary Examiner*—Justin Fischer
(74) *Attorney, Agent, or Firm*—Jacobson Holman PLLC

(57) ABSTRACT

A method for connecting the ends of flat tubular film sheets made of thermoplastic plastic that are equipped with side creases with one another by means of a lateral welding seam in such a manner that the interior creases remain permeable from the exterior even in the connection area. The end of one sheet is equipped with cuts separating the interior edges of the side creases. The end of the other sheet is inserted or placed into the separated area in such a way that both walls of the cut sheet overlie the inserted end, with a layer of each side crease of the end area of the inserted tubular film between the walls. Separating layers are inserted or placed into the side creases of the inserted end area, and the ends of the two sheets are then connected with one another by means of a lateral welding seam.

6 Claims, 4 Drawing Sheets

METHOD FOR CONNECTING TWO ENDS OF FLAT TUBULAR FILM SHEETS EQUIPPED WITH SIDE CREASES

BACKGROUND OF THE INVENTION

1. Field of the Invention

The invention relates to a method for connecting two ends of flat tubular film sheets equipped with side creases made of thermoplastic plastic, preferably for connecting the end of a side crease tubular film sheet to the beginning of a new side crease tubular film roll.

2. Description of the Related Art

Sacks are usually produced from continuous and intermittently pre-drawn or conveyed flat side crease tubular film sheets made of thermoplastic plastic. In order not to have to interrupt the continuous production after the side crease tubular film sheet has run out by inserting a new side crease tubular film sheet, it is necessary to connect the end of the side crease tubular film sheet roll that has run out to the beginning of a new side crease tubular film sheet roll in a way that the continuous conveying and production of the sacks is not interrupted. This requires a connection of the ends of the side crease tubular film sheet in such a way that the side creases remain permeable at the connection site, i.e., that the layers of the side creases that are arranged on top of each other are not glued or welded together. This type of permeability of the side creases in the connection area cannot be achieved, for example, if the ends to be connected to one another are arranged on top of each other, and connected by means of a lateral welding seam, which then includes all layers that are welded together.

SUMMARY OF THE INVENTION

It is therefore the task of the invention to recommend a method of the previously mentioned type that enables the welding of the ends of a side crease tubular film sheet in such a way that the layers of the side creases that are arranged on top of each other are not welded together.

According to the invention, this task is solved in a method of the previously mentioned type in that an end is equipped with cuts separating the interior edges of the side creases, and the other end is inserted or placed into the separated area in such a way that both walls each include the other end between a layer of each side crease of the end area of the tubular film, and that separating layers are inserted or placed into the side creases of the included other end area, and the ends are then connected to one another by means of a lateral welding seam.

The method according to the invention enables the connecting of the ends of two side crease tubular film sheets in a way that the walls of the included side creases that are placed on top of each other do not weld together so that the side creases remain permeable from the exterior sides, and a connection of the ends is possible in a way that does not interrupt the continuous production process of, for example, sacks, or carrying bags. A sack containing a connection area can easily be discarded as scrap.

Purposefully, the interior edges of the beginning of a new tubular film sheet are separated, because the resulting connection better integrates with the production process.

BRIEF DESCRIPTION OF THE DRAWINGS

One embodiment example is explained in further detail using the following drawings which show.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
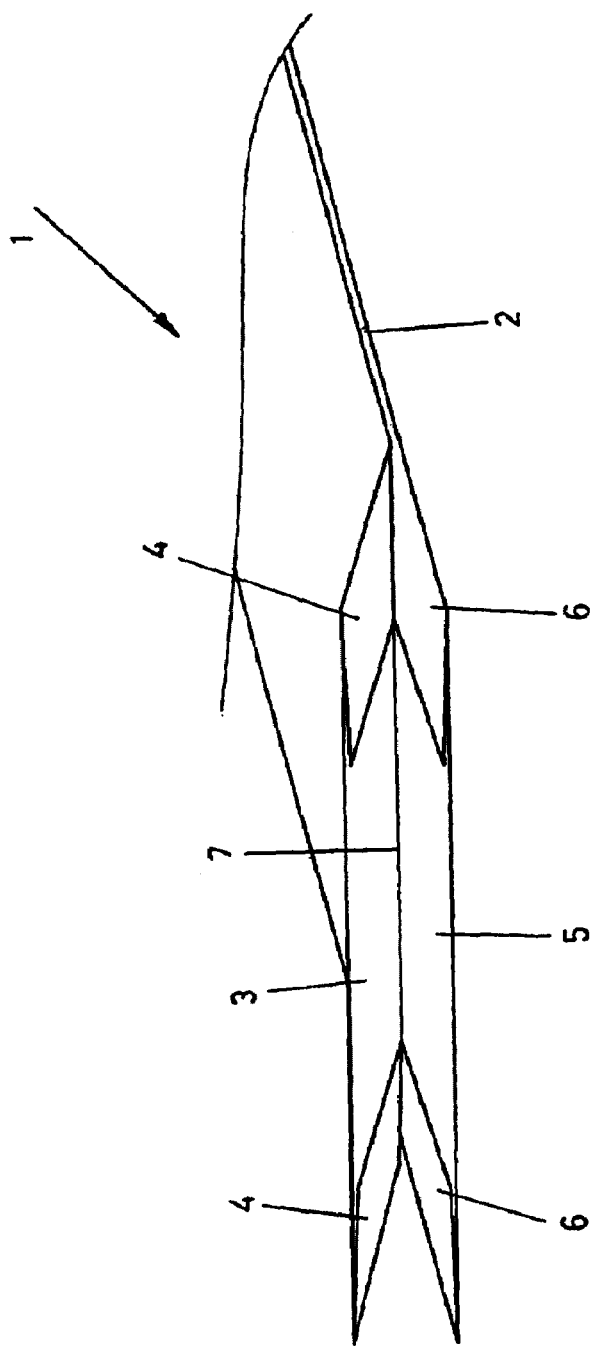
FIG. 1 is a perspective view of the roll beginning of a new roll that is equipped with cuts separating the interior edges of the side creases.

FIG. 1 shows the beginning of a side crease tubular film sheet 1 that is to be connected to the end of a side crease tubular film sheet that is running out by means of a lateral cutting edge. The interior edges of the side creases 2 are cut open in the end area so that the upper side 3 of the side crease tubular film sheet 1 can be lifted with the upper layers 4 of the side creases 2 from the lower layer 5 with the side crease layers 6 up to a line 7, which is defined by the interior ends of the separating cuts separating the side creases.

Figure 2:
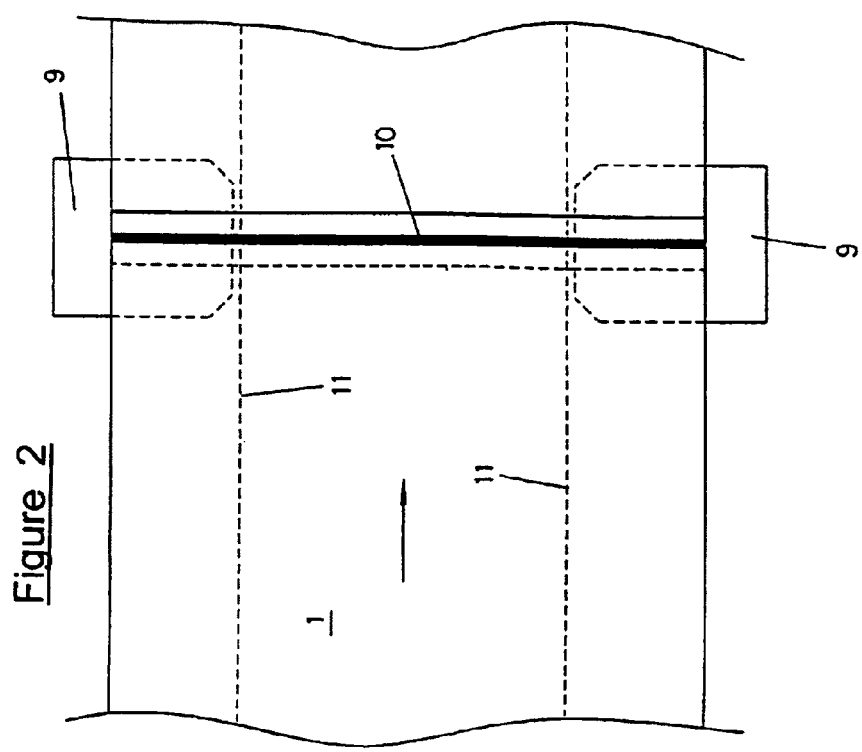
FIG. 2 is a top view of the ends of two side crease tubular film sheets that are connected to one another.
Figure 3:
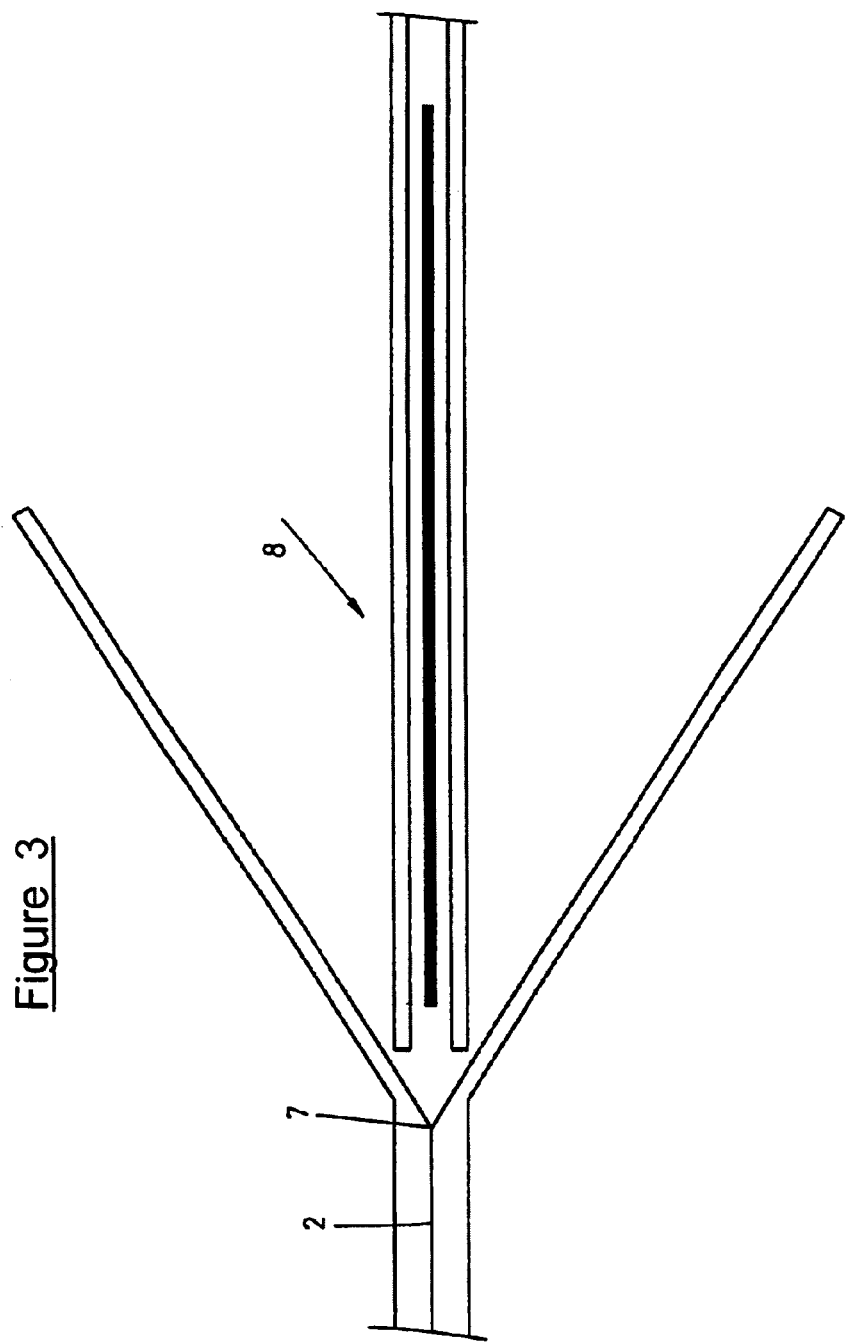
FIG. 3 is a side view of an end area of a side crease tubular film sheet in which the interior edges of the side creases are equipped with separating cuts, and the upper and bottom sides of the sheet are opened so that the end of the sheet to be connected is inserted into the opened area.
Figure 4:
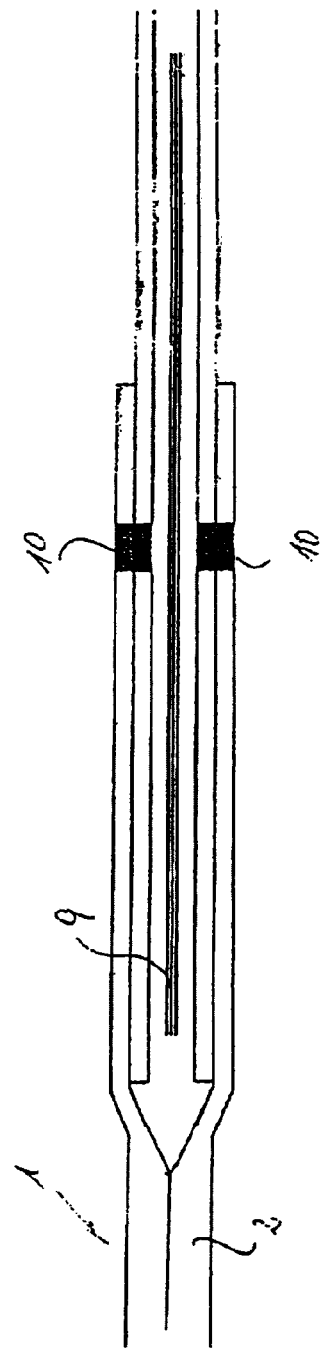
FIG. 4 is an illustration corresponding with FIG. 3 in which the sheets are connected with one another by means of a lateral welding seam.

After opening the end area of the tubular film sheet 1 by means of lifting the upper and lower sides 3, 5 of the layers 4, 6 of the side creases 2 that are separated from each other by means of the separating cut up to the lateral line 7, the end 8 to be connected to the second side crease tubular film sheet is inserted into the opened area in a manner illustrated in FIG. 3. Separating layers, such as separating plates 9 are then inserted from the sides into the beginning area of the side creases of the beginning 8 of the tubular film sheet to be connected in a manner illustrated in FIG. 2. The opened layers of the sheet to be connected are then congruently placed onto the end of the sheet running out, and the end areas of the sheets to be connected that are inserted in the area of the separating layer 9 are then connected to each other by means of a lateral welding seam 10. The areas between the interior edges 11 of the side creases of the upper and lower walls of the side crease tubular film sheet ends to be connected are welded together by means of the lateral welding seam 10. However, the layers of the inserted ends of the side crease tubular film sheets that are arranged on top of each other do not weld together due to the separating layer 9 inserted in the connection area so that the interior side crease area remains permeable even in the connection area. Due to the lateral welding seam, however, the layers of the side creases each abutting the exterior and interior sides are welded to these layers, and the end areas cut free from the side creases by means of separating cuts are welded to those of the exterior sides of the inserted ends of the side crease tubular film sheets included by them.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for connecting two ends of side crease tubular film sheets made of thermoplastic plastic, comprising the steps of:
   equipping a first end of a first side crease tubular film sheet with cuts separating interior edges of the side creases to form a separated area, said first side crease tubular film sheet having first and second walls extending between said side creases;
   placing or inserting a second end of a second side crease tubular film sheet into the separated area in such a way that both of said walls overlie the second end with one layer each of each side crease of the end area of said second tubular film sheet being sandwiched between said walls;
   placing or inserting separating layers into the side creases of the sandwiched second end area; and
   connecting the first and second ends with one another with a lateral welding seam.

2. The method according to claim 1, wherein the interior edges that are separated are part of a beginning portion of a new tubular film sheet.

3. The method according to claim 1, wherein said step of connecting includes connecting the first end areas cut free by said cuts to exterior sides of the sandwiched second end.

4. A method for connecting a first end of a first flat tubular film sheet to a second end of a second flat tubular film sheet, said first and second sheets being equipped with side creases, comprising the step of:
   equipping said first end with cuts separating interior edges of the side creases of said first sheet to form a separated area, said first film sheet having first and second walls;
   placing the second end of said second sheet into the separated area in such a way that said second end is sandwiched between said first and second walls, said sandwiched second end including one layer of each side crease of the second end;
   inserting a separating layer into the side crease on each side of the sandwiched second end; and
   connecting areas of the first and second walls between the interior edges of the side creases to the second end with a lateral welding seam, said side creases of the sandwiched second end remaining permeable due to said separating layer inserted in said creases.

5. The method according to claim 4, wherein the interior edges that are separated are part of a beginning portion of a new tubular film sheet.

6. The method according to claim 4, wherein said step of connecting includes connecting the first end areas cut free by said cuts to exterior sides of the sandwiched second end.

* * * * *